United States Patent
Savstrom

(10) Patent No.: US 12,440,930 B2
(45) Date of Patent: Oct. 14, 2025

(54) FUME EXTRACTOR

(71) Applicant: Donaldson Company, Inc., Bloomington, MN (US)

(72) Inventor: Jacob C. Savstrom, Mound, MN (US)

(73) Assignee: Donaldson Company, Inc., Bloomington, MN (US)

( * ) Notice: Subject to any disclaimer, the term of this patent is extended or adjusted under 35 U.S.C. 154(b) by 466 days.

(21) Appl. No.: 17/782,517

(22) PCT Filed: Dec. 3, 2020

(86) PCT No.: PCT/US2020/063002
§ 371 (c)(1),
(2) Date: Jun. 3, 2022

(87) PCT Pub. No.: WO2021/113437
PCT Pub. Date: Jun. 10, 2021

(65) Prior Publication Data
US 2023/0001521 A1    Jan. 5, 2023

Related U.S. Application Data

(60) Provisional application No. 62/944,162, filed on Dec. 5, 2019.

(51) Int. Cl.
*B23K 37/00* (2025.01)
*B08B 15/04* (2006.01)

(52) U.S. Cl.
CPC .............. *B23K 37/00* (2013.01); *B08B 15/04* (2013.01)

(58) Field of Classification Search
CPC ...... B08B 15/00; B08B 15/04; B23K 37/0461
See application file for complete search history.

(56) References Cited

U.S. PATENT DOCUMENTS 2,283,140 A * 5/1942 Johnston ............ B23K 37/0461
219/159
4,512,245 A * 4/1985 Goldman ............... B01D 46/10
55/472
(Continued)

FOREIGN PATENT DOCUMENTS

CA    3001031 A1 * 10/2019 ........... A47L 7/0095
CN    1618391 A    5/2005
(Continued)

OTHER PUBLICATIONS

The Best Welding Tables for Aluminum Welding, Jan. 23, 2017, Forster 3D Welding Systems https://www.forsteramerica.com/best-welding-tables-aluminum-welding/ (Year: 2017).*
(Continued)

*Primary Examiner* — Edelmira Bosques
*Assistant Examiner* — Michael James Giordano
(74) *Attorney, Agent, or Firm* — Mueting Raasch Group

(57) ABSTRACT

A fume extractor has an extractor housing (110, 210) defining an outlet (106, 206). A hose (120, 220) is coupled to the extractor housing that defines a first inlet (102, 202). A diffusion plate (130, 230) is coupled to the extractor housing that defines a plurality of openings (132, 232) cumulatively defining a second inlet (104, 204). A fan (280, 530) is disposed in the extractor housing, where the fan configured to connect each of the first inlet and the second inlet to the outlet. A first supporting surface (160) is opposite the diffusion plate relative to the extractor housing and a second supporting surface (170) at least 80° to the diffusion plate, where the first supporting surface and the second supporting surface are configured to selectively rest on a planar surface. The fume extractor defines a hose channel (140) configured to selectively receive the hose.

18 Claims, 7 Drawing Sheets

(56) References Cited

U.S. PATENT DOCUMENTS

| | | | |
|---|---|---|---|
| 4,860,644 A | 8/1989 | Kohl et al. | |
| 5,362,036 A * | 11/1994 | Whiteman | B23Q 3/103 |
| | | | 269/900 |
| 5,511,764 A | 4/1996 | Wonsteler | |
| 6,395,047 B1 | 5/2002 | Smith | |
| 6,444,002 B1 * | 9/2002 | Mai | B08B 15/04 |
| | | | 55/467 |
| 6,607,573 B1 | 8/2003 | Chaurushia et al. | |
| 6,663,698 B2 | 12/2003 | Mishin et al. | |
| 6,679,416 B2 | 1/2004 | Lin | |
| 7,513,922 B2 | 4/2009 | Cheng | |
| 8,460,417 B2 | 6/2013 | Reid et al. | |
| 8,517,054 B2 * | 8/2013 | Lai | H05K 7/20727 |
| | | | 137/625.33 |
| 2003/0111509 A1 * | 6/2003 | Lin | B23K 37/0461 |
| | | | 228/47.1 |
| 2003/0217675 A1 | 11/2003 | Cheng | |
| 2005/0055795 A1 * | 3/2005 | Zeiler | H01M 50/204 |
| | | | 15/353 |
| 2008/0276806 A1 | 11/2008 | Cheng | |
| 2010/0115896 A1 | 5/2010 | Reid et al. | |
| 2010/0282728 A1 * | 11/2010 | Cole | B23K 9/325 |
| | | | 219/136 |
| 2013/0291951 A1 * | 11/2013 | Carman | B23K 9/325 |
| | | | 137/486 |
| 2016/0193635 A1 | 7/2016 | Mate et al. | |
| 2017/0016640 A1 | 1/2017 | Moon et al. | |
| 2017/0266596 A1 | 9/2017 | Huntley | |
| 2019/0343264 A1 | 11/2019 | Zahedi et al. | |

FOREIGN PATENT DOCUMENTS

| | | | |
|---|---|---|---|
| CN | 101721166 A | | 6/2010 |
| CN | 102039507 A | * | 5/2011 |
| CN | 103386563 A | | 11/2013 |
| CN | 204487600 U | | 7/2015 |
| CN | 106137025 A | | 11/2016 |
| CN | 205732091 U | | 11/2016 |
| CN | 207785060 U | | 8/2018 |
| CN | 208138164 U | | 11/2018 |
| CN | 208662886 U | | 3/2019 |
| EP | 1832354 A1 | | 9/2007 |
| EP | 2255898 A1 | | 12/2010 |
| KR | 101417449 B1 | | 7/2014 |
| WO | 2021113437 A1 | | 6/2021 |

OTHER PUBLICATIONS

Mark Kisenwether, What is the minimum thickness of metal for a welding table top?, 2018, Quora https://www.quora.com/What-is-the-minimum-thickness-of-metal-for-a-welding-table-top (Year: 2018).*
Airfiltronix, "Airfiltronix 200A HS3000A2240V Portable Fume Extractor, Double Hose; 240 VAC," Airfiltronix, Cole-Parmer Instrument Company, LLC, retrieved from internet, https://www.coleparmer.com/i/airfiltronix-200a-hs3000a2240v-portable-fume-extractor-double-hose-240-vac/3370546, 2 pages.
Allegro, "Allegro 9450-FHE Portable Fume Extractor Filters," Allegro, Industrial Safety Products, 2024, retrieved from internet, https://www.industrialsafetyproducts.com/allegro-9450-fhe-portable-fume-extractor-filters/, 4 pages.
International Preliminary Report on Patentability in PCT/US2020/063002, mailed May 17, 2022, 7 pages.
International Search Report in PCT/US2020/063002, mailed Mar. 22, 2021, 11 pages.
Miller Electric Manufacturing, "Miller® 115V Single Phase 60Hz 875 CFM FILTAIR® SA-W807-WM Fume Extractor Package," Miller Electric Manufacturing, 2024, Airgas, Inc. retrieved from the internet, https://www.airgas.com/product/Welding-Products/Welding-Support-Equipment/Fume-Extraction-Equipment/p/MIL951519, 2 pages.

* cited by examiner

FUME EXTRACTOR

CROSS REFERENCE TO RELATED APPLICATIONS

This application is the § 371 U.S. National Stage of International Application No. PCT/US2020/063002, filed 3 Dec. 2020, which claims the benefit of U.S. Provisional Application No. 62/944,162, filed 5 Dec. 2019, the disclosures of which are incorporated by reference herein in their entireties.

TECHNOLOGICAL FIELD

The present disclosure is generally related to fume extractors. More particularly, the present disclosure is related to fume extractors having alternate configurations.

BACKGROUND

Most welding processes generate some type of unpleasant fume, but operators generally need to be positioned closely to the process, and therefore closely to the unpleasant fumes, in order to execute welding operations. The generated fumes can be extracted by a fume extractor that filters the fumes. Fume extractors can be configured for point-of-use or zone extraction. Fume extractors can be relatively large and loud, which can present difficulties to welders that work in small facilities.

SUMMARY

The technology disclosed herein is directed to portable fume extractors. In examples, a fume extractor has an extractor housing defining an outlet. A hose is coupled to the extractor housing, where the hose defines a first inlet of the fume extractor. A diffusion plate is coupled to the extractor housing, where the diffusion plate defines a plurality of openings that cumulatively define a second inlet of the fume extractor. A fan is disposed in the extractor housing, where the fan configured to connect each of the first inlet and the second inlet to the outlet. A first supporting surface is opposite the diffusion plate relative to the extractor housing. A second supporting surface is from 80° to 100° to the diffusion plate, where the first supporting surface and the second supporting surface are configured to selectively rest on a planar surface. The fume extractor defines a hose channel configured to selectively receive the hose.

In some such embodiments, the hose channel extends about a periphery of the fume extractor. Additionally or alternatively, the hose channel is defined between the extractor housing and the diffusion plate. Additionally or alternatively, the fume extractor has a hose guide. Additionally or alternatively, the hose defines an intake area of less than 79.2 in$^2$. Additionally or alternatively, the diffusion plate defines an intake area of greater than 79.2 in$^2$. Additionally or alternatively, the fume extractor has a filter disposed in the extractor housing in an airflow pathway between the first and second inlets and the outlet. Additionally or alternatively, the fume extractor has an electrically conductive wire electrically coupling the diffusion plate to the first supporting surface and the second supporting surface. Additionally or alternatively, each of the plurality of openings is threaded.

Additionally or alternatively, the first supporting surface is defined by a plurality of feet extending outward from the extractor housing away from the diffusion plate. Additionally or alternatively, the second supporting surface is partially defined by the extractor housing. Additionally or alternatively, the first supporting surface is completely defined by the extractor housing. Additionally or alternatively, the diffusion plate is constructed of aluminum having a thickness of at least 0.25 inches. Additionally or alternatively, the openings in the diffusion plate are each circular with a diameter of at least ⅜-inch. Additionally or alternatively, the hose defines an airflow pathway and has an obstruction that selectively obstructs the airflow pathway upon the hose channel receiving the hose. Additionally or alternatively, the fume extractor has a flow rate regulator configured to measure and regulate airflow.

Additionally or alternatively, the first inlet and the second inlet are arranged in series. Additionally or alternatively, the first inlet and the second inlet are arranged in parallel. Additionally or alternatively, the diffusion plate has a fixed plate defining a fixed plurality of openings and a sliding plate defining a sliding plurality of openings, where the sliding plate is slidably coupled to the fixed plate to selectively align the fixed plurality of openings with the sliding plurality of openings. Additionally or alternatively, the first inlet is in selective fluid communication with the second inlet.

The above summary is not intended to describe each embodiment or every implementation. Rather, a more complete understanding of illustrative embodiments will become apparent and appreciated by reference to the following Detailed Description of Exemplary Embodiments and claims in view of the accompanying figures of the drawing.

The present technology may be more completely understood and appreciated in consideration of the following detailed description of various embodiments in connection with the accompanying drawings.

The figures are rendered primarily for clarity and, as a result, are not necessarily drawn to scale. Moreover, various structure/components, including but not limited to fasteners, electrical components (wiring, cables, etc.), and the like, may be shown diagrammatically or removed from some or all of the views to better illustrate aspects of the depicted embodiments, or where inclusion of such structure/components is not necessary to an understanding of the various exemplary embodiments described herein. The lack of illustration/description of such structure/components in a particular figure is, however, not to be interpreted as limiting the scope of the various embodiments in any way.

DETAILED DESCRIPTION

The present technology is directed to a fume extractor. The fume extractor can be selectively configurable to accommodate various needs of the user. In some embodiments the fume extractor is portable. The fume extractor can be used alternately for both point-of-use filtration and zone filtration. The fume extractor can also provide work surface for welding operations. In some embodiments the fume extractor generates relatively low noise compared to some other fume extractors.

Figure 1:
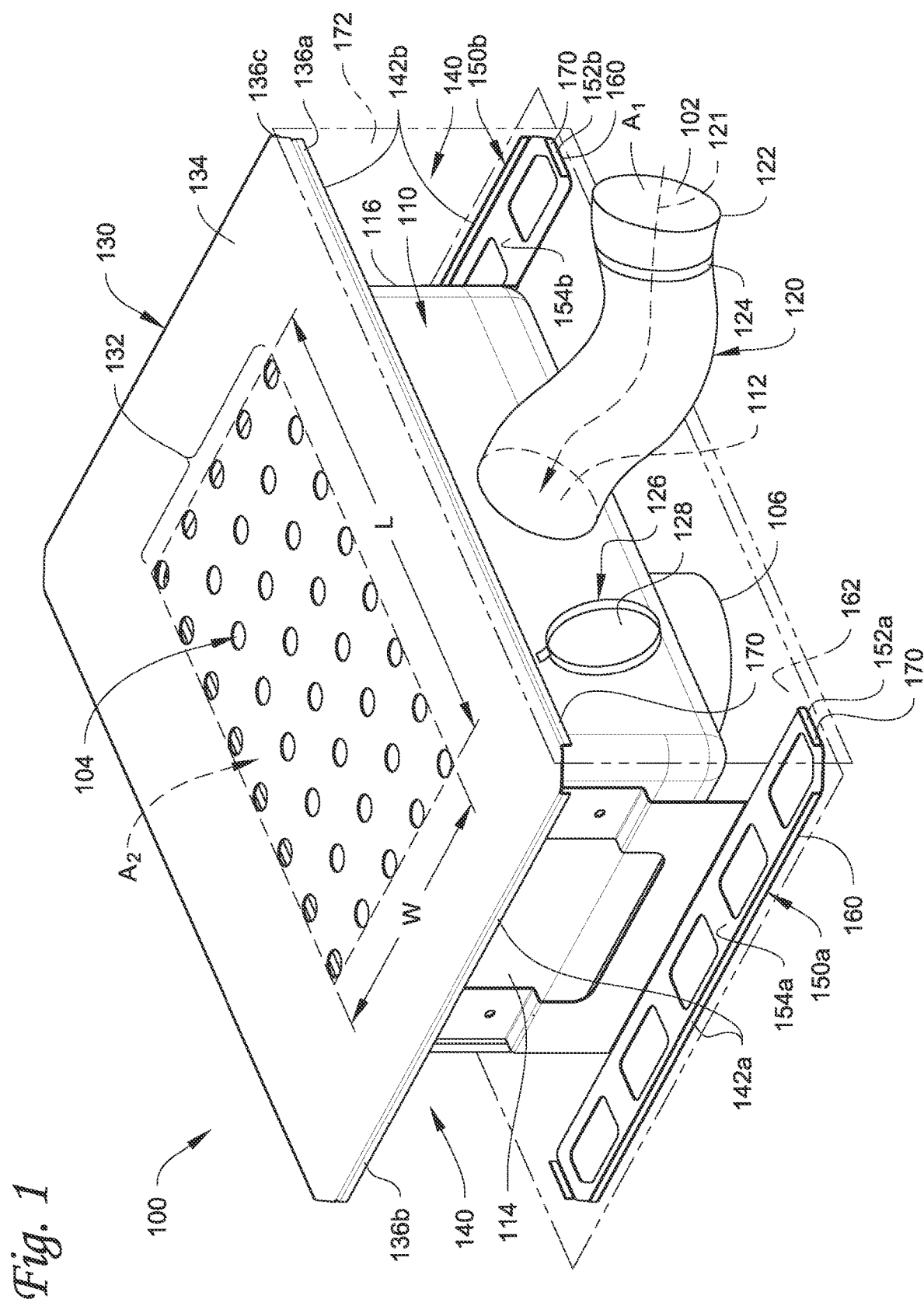
FIG. 1 is a perspective view of an example portable fume extractor consistent with the technology disclosed herein.

FIG. 1 depicts a perspective view of an example fume extractor 100 consistent with some embodiments. The fume extractor 100 is generally configured to extract fumes from a work area. The fume extractor 100 generally has an extractor housing 110, a diffusion plate 130 coupled to the extractor housing 110, and a hose 120 coupled to the extractor housing 110.

The extractor housing 110 is generally configured to contain various components. In some embodiments, the extractor housing 110 houses at least a fan and a filter (not currently depicted). The extractor housing 110 generally defines an outlet 106 of the fume extractor 100.

The extractor housing 110 can be constructed of various types of materials and combinations of materials. In some embodiments, the extractor housing 110 is a plastic. In some such embodiments, the extractor housing 110 is a molded plastic. In some embodiments, the extractor housing 110 is constructed of metal. In various embodiments the extractor housing 110 is configured to be portable. For example, the extractor housing 110 can have a handle (not currently depicted) such that a user can carry the fume extractor 100. In various embodiments the extractor housing 110 can be openable and re-closeable such that a user can access the interior of the extractor housing 110 to, for example, replace or adjust components.

The hose 120 generally defines a first inlet 102 of the fume extractor 100. The hose 120 defines an airflow pathway 121 into the extractor housing 110. In various embodiments, the hose 120 defines an airflow pathway 121 to the fan disposed in the extractor housing 110. The hose 120 can be coupled to the extractor housing 110 about a first housing opening 112 (represented with a dotted line).

The hose 120 is generally configured to be used by a user as a point-of-use fume extractor. As such, the first inlet 102 can be referred to as a point-of-use extractor inlet. In particular, a distal end 122 of the hose 120 is configured to be positioned adjacent to a work surface. The distal end 122 of the hose 120 can have a securing device 124 such as a clamp, brace, or mount that is configured to secure the distal end 122 of the hose 120 to a work surface. In some examples a magnetic mount is coupled to the distal end 122 of the hose 120 to magnetically couple the distal end 122 of the hose 120 to a work surface.

The hose 120 generally has sufficient flexibility to be wound about a hose channel 140 for storage (as will be described in more detail below), un-wound from the hose channel 140, and be positioned in various locations and orientations relative to the extractor housing 110 to accommodate a variety of work surfaces and environments. In some embodiments the hose 120 can be constructed of a flexible plastic or rubber. In some embodiments the hose 120 can be constructed of a plurality of rigid segments that are joined at flexible joints. The hose 120 can have a length of at least 2 feet. In some embodiments the hose 120 has a length ranging from 1 foot to 8 feet.

The diffusion plate 130 generally defines a second inlet 104. The diffusion plate 130 is configured to diffuse the airflow through the second inlet 104. In particular, the diffusion plate 130 defines a plurality of openings 132 that cumulatively define the second inlet 104 of the fume extractor 100. The diffusion plate 130 is generally configured to facilitate zone extraction. As such, the second inlet 104 can be referred to as a zone extraction inlet. In some embodiments the diffusion plate 130 is configured to be an inlet for backdraft extraction. In some embodiments the diffusion plate 130 is configured to be an inlet for downdraft extraction. In some embodiments the diffusion plate 130 is positioned by a user to selectively achieve backdraft extraction or downdraft extraction. In some embodiments the fume extractor 100 is positioned by a user in a workstation to selectively achieve backdraft extraction or downdraft extraction, which will be described in more detail, below.

In various embodiments, the diffusion plate 130 is configured to selectively define a work surface for welding operations. As such, the diffusion plate 130 has a main surface 134 that is substantially planar, where the main surface 134 defines the plurality of openings 132. Each of the plurality of openings 132 can be circular, in various embodiments. In some such embodiments, each of the plurality of openings 132 have a diameter of at least ⅜-inch, although other diameters are possible, as well. In various embodiments, each of the plurality of openings 132 can be threaded to receive mating fasteners such that the diffusion plate 130 can be used as a fixture table.

To facilitate welding operations, the diffusion plate 130 can be constructed of an electrically conductive material, such as aluminum. In some embodiments, the diffusion plate 130 is constructed of steel. The diffusion plate 130 can have a thickness ranging from 0.01 inches to 1.5 inches or from 0.025 inches to 0.80 inches. In some particular embodiments, the diffusion plate 130 can be at least 0.25 inches thick. In the current example, the diffusion plate 130 defines plate flanges 136a-c extending substantially orthogonally from the main surface 134, where "substantially orthogonally" is used to mean within +/−5° from orthogonal. More particularly, the diffusion plate 130 defines a plurality of plate flanges 136 along each side of the main surface 134. The plate flanges 136a-c each extend towards the extractor housing 110. The plate flanges 136 a-c will be described in more detail, below.

Zone extraction, which is enabled by the diffusion plate 130, can be distinguished from point-of-use extraction, which is enabled by the hose 120. Generally, zone extraction and point-of-use extraction can be differentiated based on the intake area defined by the inlet of the fume extractor 100. An intake area of less than 79.2 in$^2$ will generally be considered point-of-use extraction, and an intake area of greater than 79.2 in$^2$ will generally be considered zone extraction. Zone extraction can also be distinguished from point-of-use extraction based on the capture velocity, where the capture velocity is the velocity of the air passing through the intake area. The capture velocity $V_{capture}$ can be determined by the following equation, where the volumetric flow rate is defined by the volume of air passing through the fume extractor 100:

$$V_{capture} = \frac{\text{Volumetric flow rate}}{\text{Intake area}}$$

In some embodiments, a capture velocity of about 100 ft/min distinguishes zone extraction from point-of-use extraction at a flow rate of about 55 ft$^3$/min.

The first inlet 102 defined by the hose 120 generally has an intake area $A_1$ that is less than about 79.2 in$^2$, and the second inlet 104 defined by the diffusion plate 130 generally has an intake area $A_2$ that is greater than about 79.2 in$^2$. The intake area $A_2$ of the second inlet 104 is calculated based on the outer dimensions, specifically the length L and the width W, of the plurality of openings 132. In various embodiments, the first inlet 102 has an intake area $A_1$ that is less than 50 in$^2$. In some embodiments, the first inlet 102 has an intake area $A_1$ that ranges from 20 in$^2$ to 40 in$^2$. In various embodiments, the second inlet 104 has an intake area $A_2$ that is greater than or equal to 150 in$^2$. In some embodiments, the second inlet 104 has an intake area $A_2$ that ranges from about 200 in$^2$ to 400 in$^2$.

The fan disposed in the extractor housing 110 is configured to be in communication with the first inlet 102, the second inlet 104, and the outlet 106. In particular, the fan selectively generates airflow from the first inlet 102 and/or the second inlet 104 through the outlet 106. In some embodiments, the fan simultaneously connects the first inlet 102 and the second inlet 104 to the outlet 106. The first inlet 102 and the second inlet 104 can be arranged in parallel or in a series. In some embodiments where the first inlet 102 and the second inlet 104 are arranged in parallel, one of the first inlet 102 and the second inlet 104 can be selectively obstructed with valves, barriers, and the like, to enable airflow through the other of the first inlet 102 and the second inlet 104. An embodiment where a first inlet and a second inlet can be arranged in series is described below with reference to FIGS. 2-5.

In some embodiments the fan alternately connects the first inlet 102 or the second inlet 104 to the outlet 106. In such an embodiment a valve can be used to selectively fluidly couple the fan with the first inlet 102 or the second inlet 104, which is described in more detail with reference to FIG. 8. In various embodiments, the first inlet 102 being in communication with the outlet 106 and the second inlet 104 being in communication with the outlet 106 are mutually exclusive.

The fume extractor 100 has a first supporting surface 160 that is opposite the diffusion plate 130 relative to the extractor housing 110. The first supporting surface 160 is generally configured to selectively rest on a planar surface, such as a tabletop or a floor. A "supporting surface" is defined herein as a structure that allows the fume extractor 100 to stand on its own on a generally horizontal surface. The first supporting surface 160 defines a first support plane 162 that is opposite the main surface 134 relative to the extractor housing 110. In various embodiments the first support plane 162 is parallel to the main surface 134 of the diffusion plate 130. In various embodiments the main surface 134 of the diffusion plate 130 is configured to form a substantially horizontal work surface when the first supporting surface 160 rests on a tabletop or floor.

In the current example, the first supporting surface 160 is defined by a first bracket 150a and a second bracket 150b. The first bracket 150a is coupled to a first sidewall 114 of the extractor housing 110 and the second bracket 150b is coupled to a second sidewall 116 of the extractor housing 110. The first sidewall 114 is opposite the second sidewall 116 relative to the extractor housing 110. The first bracket 150a has a first foot 154a extending away from the diffusion plate 130 and the second bracket 150b has a second foot 154b extending away from the diffusion plate 130.

In some embodiments, the portion of the extractor housing 110 defining the outlet 106 is positioned between the first supporting surface 160 and the diffusion plate 130. To configure the diffusion plate 130 as a work surface, a user can place the fume extractor 100 on a table such that the first supporting surface 160 rests on the table. Such a configuration positions the second inlet 104 of the diffusion plate 130 for downdraft extraction.

In various embodiments the first supporting surface 160 is defined by a plurality of feet 154a, 154b extending outward from the extractor housing 110 away from the diffusion plate 130. While in the current embodiment, the plurality of feet 154a, 154b are two feet defined by two brackets, other numbers of feet and/or brackets can be used. In some embodiments, four brackets can be coupled to the extractor housing that each define one foot extending away from the diffusion plate. In some embodiments, two brackets can be coupled to the extractor housing that each define two feet.

The fume extractor 100 has a second supporting surface 170 that is substantially orthogonal to the diffusion plate 130. In various embodiments, the second supporting surface 170 is greater than or equal to 80° relative to the diffusion plate 130. The second supporting surface 170 can be generally orthogonal to the diffusion plate 130, where "generally orthogonal" is defined herein as within 10° from orthogonal. The second supporting surface 170 is generally configured to selectively rest on a planar surface, such as a tabletop or a floor. The second supporting surface 170 defines a second support plane 172 that is substantially orthogonal to the main surface 134 of the diffusion plate 130. The second support plane 172 can be generally orthogonal to the main surface 134 of the diffusion plate 130. The second support plane 172 can be substantially orthogonal to the first supporting plane 162. The second support plane 172 can be generally orthogonal to the main surface 134 of the diffusion plate 130. In various embodiments the main surface 134 of the diffusion plate 130 is configured to form a substantially vertical surface when the second supporting surface 170 rests on a tabletop or floor. "Substantially vertical" is intended to mean within 5° of a vertical orientation.

In the current example, the second supporting surface 170 is cumulatively defined by the first bracket 150a, the second bracket 150b, and the diffusion plate 130. In particular, a first bracket flange 152a defined by the first bracket 150a, a second bracket flange 152b defined by the second bracket 150b, and a first plate flange 136a defined by the diffusion plate 130 cumulatively define the second supporting surface 170. To configure the diffusion plate 130 for backdraft extraction, a user can place the fume extractor 100 on a table such that the second supporting surface 170 rests on the table. Such a configuration positions the second inlet 104 of the diffusion plate 130 for backdraft extraction.

In various embodiments, the first supporting surface 160 and/or the second supporting surface 170 are configured to increase traction between the fume extractor and the planar surface. For example, the first supporting surface 160 and/or the second supporting surface 170 can have surface irregularities that results in a relatively increased surface roughness compared to a smooth surface. Generally the first supporting surface 160 and the second supporting surface 170 are configured to be electrically conductive to enable welding operations. In some embodiments, an electrically conductive wire can electrically couple the diffusion plate to each of the supporting surfaces.

While the current description focuses on the first supporting surface 160 and the second supporting surface 170, the fume extractor 100 can have up to five supporting surfaces, corresponding to the five sides of the fume extractor 100 other than the side defined by the diffusion plate 130. Each of the supporting surfaces can be similar to the first supporting surface 160 and the second supporting surface 170 described above. Alternate configurations for the supporting surfaces are also contemplated, which will be described below in association with other examples.

As mentioned above, the fume extractor 100 generally defines a hose channel 140 that is configured to selectively receive a length of the hose 120. In various embodiments, the hose channel 140 stores the hose 120 when the hose 120 is not in use. In the current example, the hose channel 140 extends about a periphery of the fume extractor 100 and, in particular, about a periphery of the extractor housing 110. The hose channel 140 is generally sized such that the hose 120, when in a stored position, does not interfere with contact between each of the supporting surfaces and the planar surface. In other words, the hose 120 is configured to be retained within the hose channel 140 within the outer perimetric boundaries of the fume extractor 100. As such, the depth and width of the hose channel 140 exceeds the diameter of the hose 120.

In some embodiments, the airflow pathway 121 defined by the hose 120 is selectively obstructed upon the hose channel 140 receiving the hose 120. For example, a holster 126 can be coupled to the extractor housing in the hose channel 140, where the holster 126 is configured to receive the distal end 122 of the hose 120 when the hose 120 is disposed in the hose channel 140. The holster 126 can have a barrier 128 that is configured to extend across the first inlet 102 to obstruct the first inlet 102. In various embodiments, the airflow pathway 121 and the first inlet 102 can be opened upon removing the hose 120 from the hose channel 140. In some other embodiments the barrier can be coupled to the hose 120 and can be positionable to reversibly obstruct the first inlet 102. For example, the barrier can be cover coupled to the hose at a hinged connection and can be pivoted between a first position where the first inlet 102 is obstructed and a second position where the first inlet 102 is unobstructed.

In the current example, the hose channel 140 is cumulatively defined by the diffusion plate 130, the extractor housing 110, the first bracket 150a and the second bracket 150b. An outer portion of the diffusion plate 103, the first foot 154a of the first bracket 150a and the second foot 154b of the second bracket 150b form hose guides 142a, 142b to retain the position of the hose 120 about the extractor housing 110 and within the outer perimetric boundaries of the fume extractor 100. In embodiments, the hose guides 142a, 142b are formed of an electrically conductive material. In embodiments, the hose guides 142a, 142b form one or more of the supporting surfaces 160, 170 of the fume extractor 100. The hose channel 140 can have other configurations, and another example will be described below.

Figure 2:
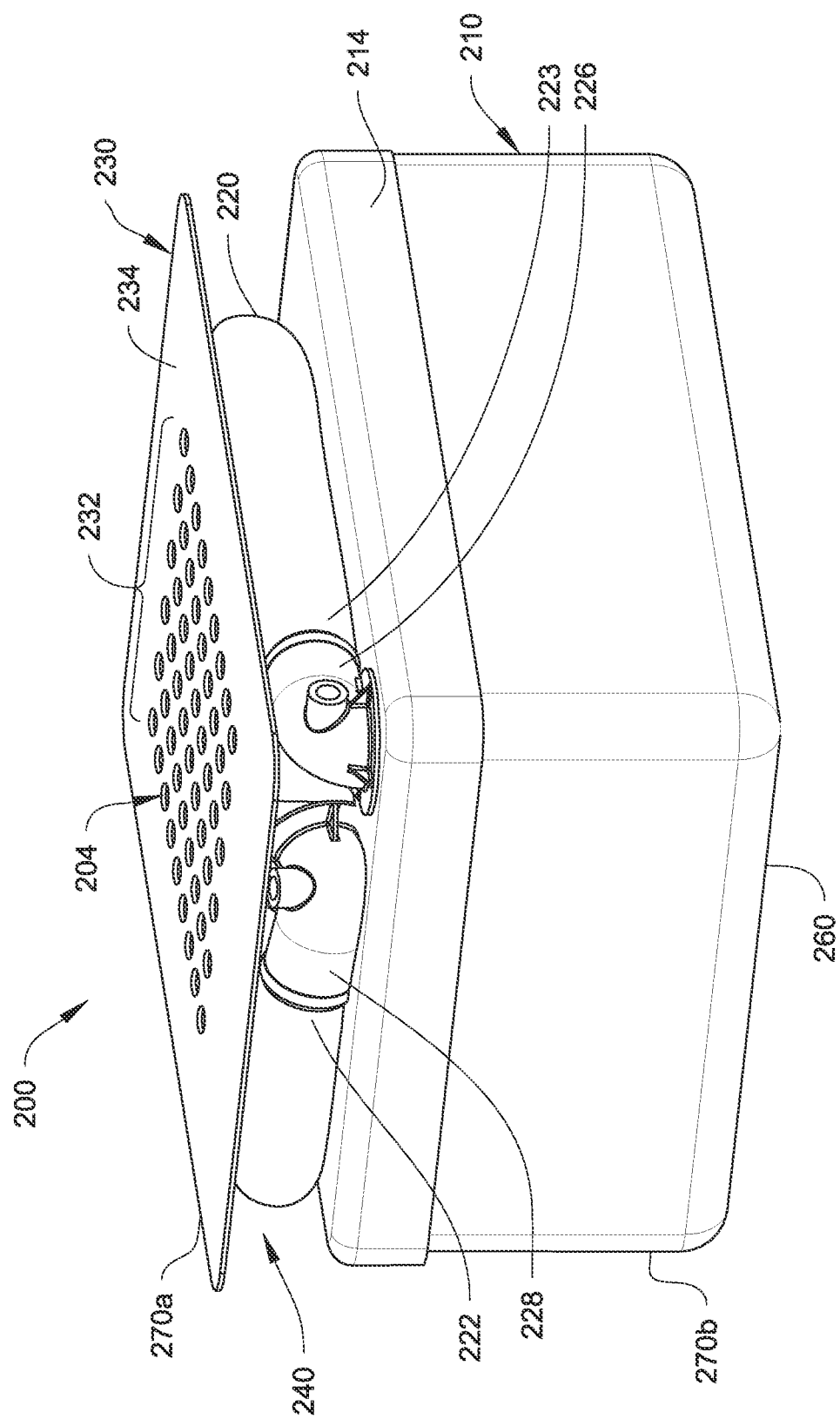
FIG. 2 is a perspective of another example fume extractor consistent with the technology disclosed herein.
Figure 3:
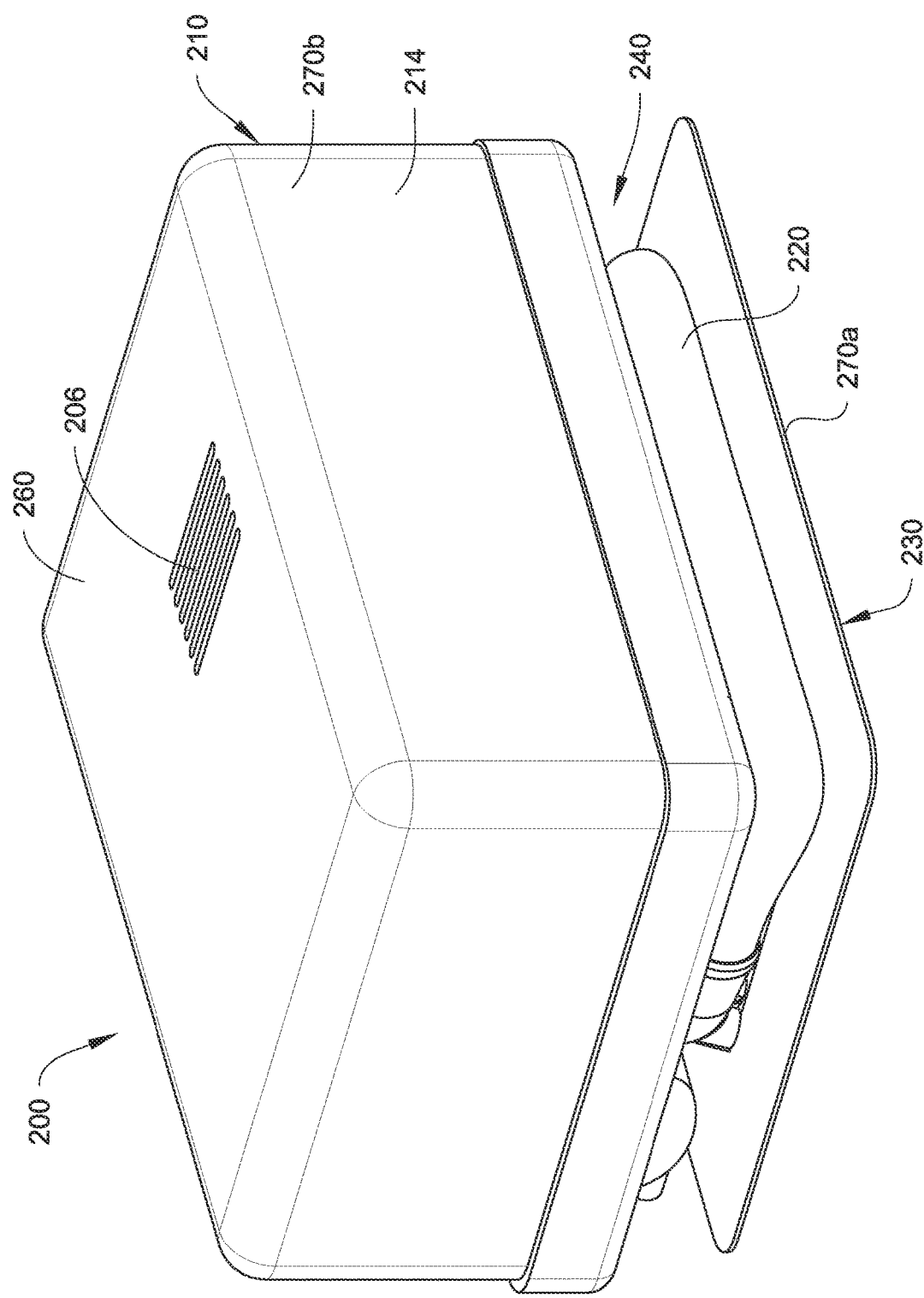
FIG. 3 is another perspective view of the fume extractor of FIG. 2.
Figure 4:
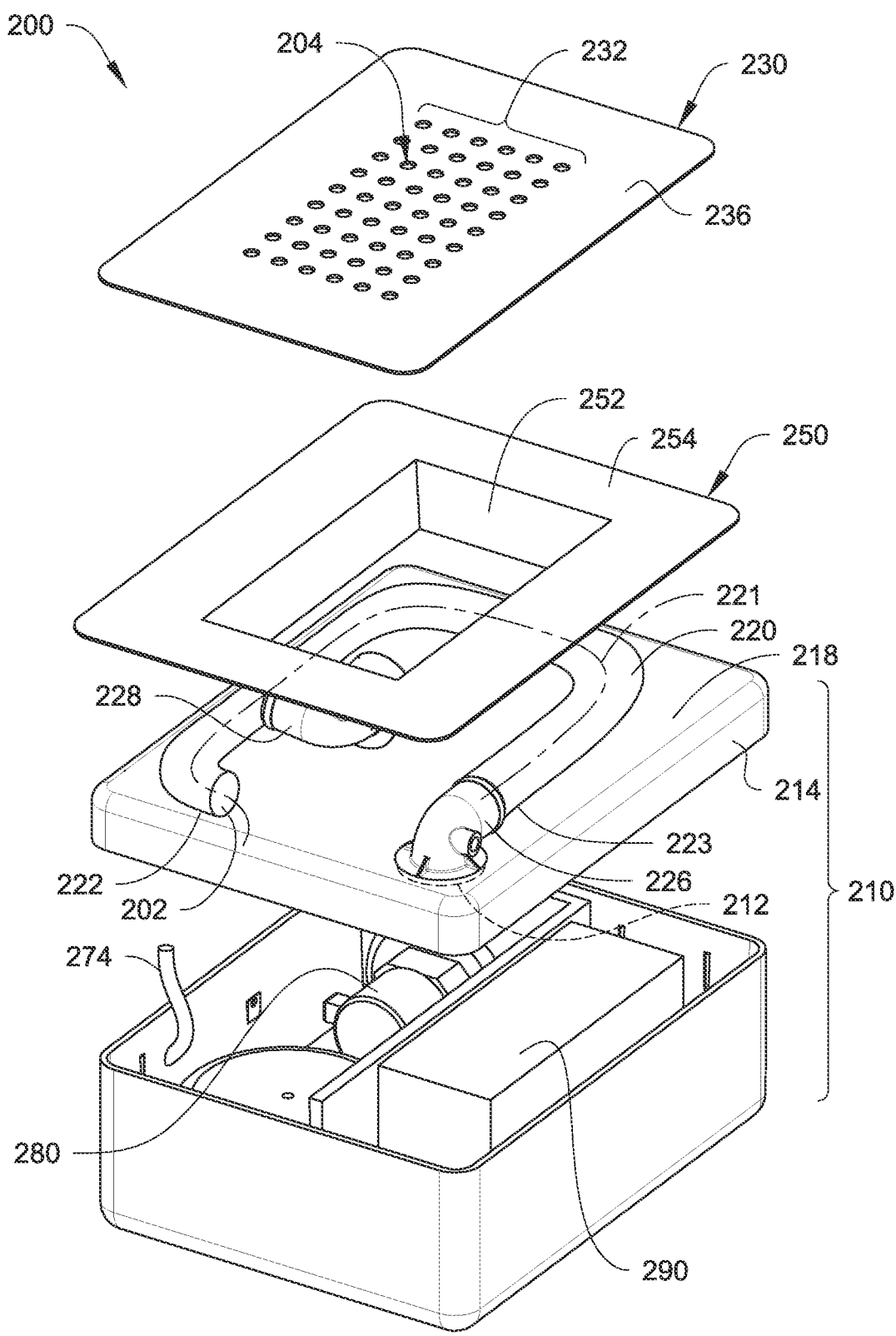
FIG. 4 is an exploded perspective view of a fume extractor consistent with FIG. 2.
Figure 5:
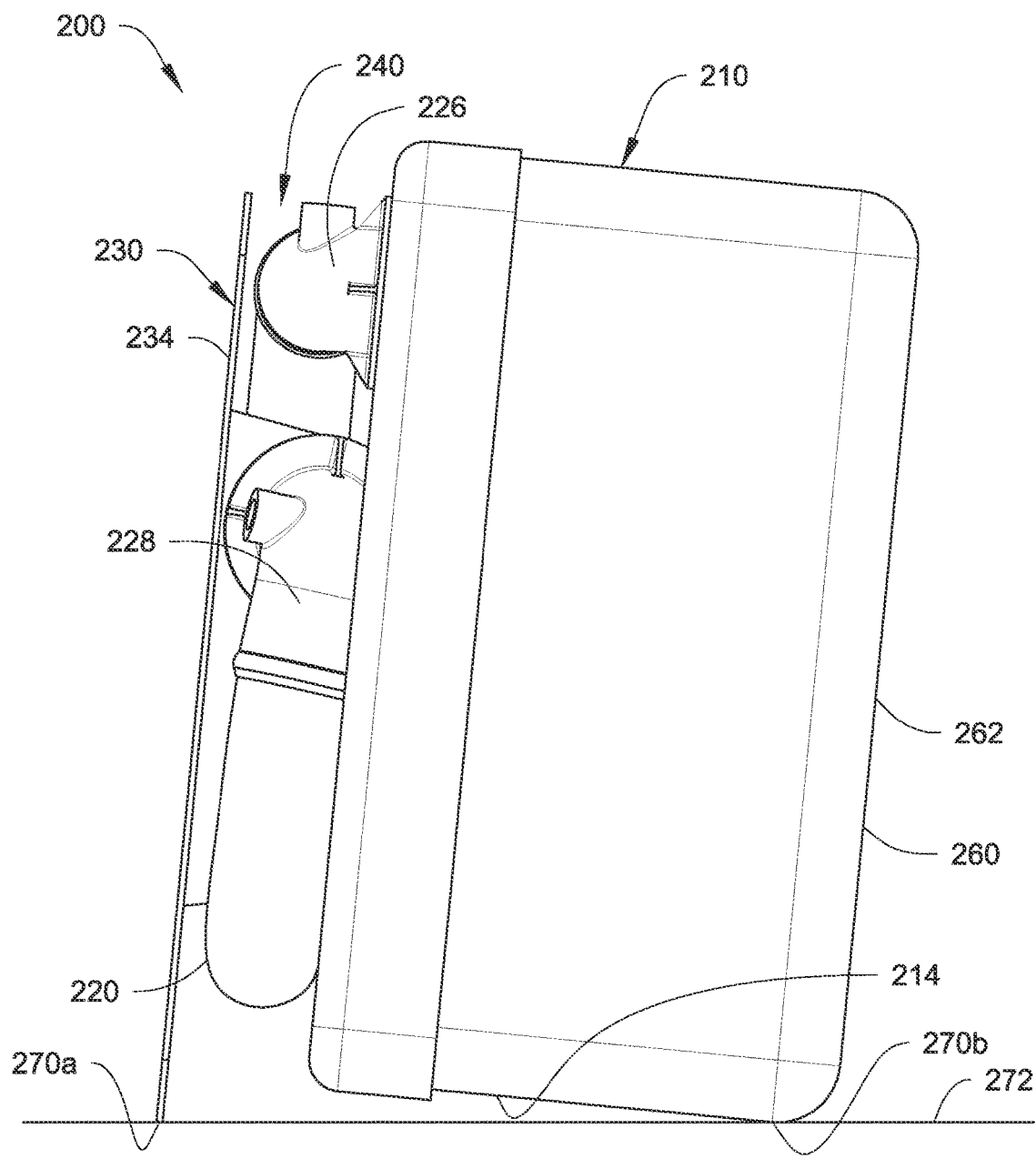
FIG. 5 is a side view of a fume extractor consistent with FIG. 2.

FIG. 2 depicts a first perspective view of another example fume extractor 200 consistent with some embodiments, FIG. 3 depicts a second perspective view of the fume extractor 200, FIG. 4 depicts an exploded view of the example fume extractor 200, and FIG. 5 depicts a side view of the fume extractor 200. The fume extractor 200 generally has an extractor housing 210, a diffusion plate 230 coupled to the extractor housing 210, and a hose 220 coupled to the extractor housing 210. The components described herein with reference to FIGS. 2-4 will generally have similar functionality and construction as corresponding components described above with reference to FIG. 1, except where explicitly contradictory.

The extractor housing 210 houses various components. For example, a fan 280 and a filter 290 can be disposed in the extractor housing 210, where the fan 280 is in fluid communication with the filter 290. The fan 280 can be various types of fans, and the filter 290 is generally configured to filter fumes generated in a work area, such as fumes generated by welding operations. The filter 290 is generally disposed in the extractor housing 210 in the airflow pathway between a first and second inlet 202, 204 and an outlet 206 of the fume extractor 200. The extractor housing 210 defines the outlet 206 of the fume extractor 200 (FIG. 3).

In some embodiments the performance of the fan 280 is adjustable by a user. In some embodiments the fan speed is adjustable, and in some embodiments the flow rate of the fan is adjustable with a flow rate regulator. Embodiments incorporating a flow rate regulator will be described in more detail with reference to FIG. 8, below.

The hose 220 generally defines a first inlet 202 of the fume extractor 200, where the first inlet 202 is particularly visible in FIG. 4. The hose 220 defines an airflow pathway 221 into the extractor housing 210. In various embodiments, the hose 220 defines an airflow pathway 221 to the fan 280 disposed in the extractor housing 210. The fan 280 is configured direct airflow from the first inlet 202 to the outlet 206. The hose 220 can be coupled to the extractor housing 210 about a first housing opening 212 (represented with a dotted line in FIG. 4). In the current example, a proximal end 223 of the hose 220 is coupled to a first connector tube 226 that passes through the first housing opening 212. A distal end 222 of the hose 220 is releasably coupled to a second connector tube 228.

In the current example, the hose 220 is generally used in both point-of-use extraction and zone extraction. In particular, in zone extraction, the distal end 222 of the hose 220 remains connected to the second connector tube 228, which will be discussed in more detail below. In point-of-use extraction, the distal end 222 of the hose 220 is disconnected from the second connector tube 228. The distal end 222 of the hose 220 can be positioned adjacent to a work surface where point-of-use extraction is desired. Similar to the example discussed above with reference to FIG. 1, the distal end 222 of the hose 220 can have a securing device such as a clamp, brace, or mount that is configured to secure the distal end 222 of the hose 220 to a work surface.

The diffusion plate 230 generally defines a second inlet 204 of the fume extractor 200. In particular, the diffusion plate 230 defines a plurality of openings 232 that cumulatively define the second inlet 204 of the fume extractor 200. The diffusion plate 230 is configured to be selectively positioned by a user to achieve backdraft extraction or downdraft extraction. More particularly, the fume extractor 200 itself is positioned by a user in a workstation to selectively achieve backdraft extraction or downdraft extraction, similar to the discussion of FIG. 1, above. Where the fume extractor 200 is positioned for downdraft extraction, the diffusion plate 203 can have a main surface 234 that defines a work surface.

The diffusion plate 230 defines the plurality of openings 232 through the main surface 234. The plurality of openings 232 can have similar configurations to those discussed above with reference to FIG. 1. The diffusion plate 230 can also have similar configurations to those discussed above with reference to FIG. 1. However, in the current example, the diffusion plate 230 does not have perimetric flanges extending substantially orthogonally to the main surface 234, but such flanges could be incorporated in the diffusion plate 230 some variations.

As is particularly visible in FIG. 4, the diffusion plate 230 is coupled to a diffusion plate housing 250 that is coupled to the extractor housing 210. The diffusion plate housing 250 defines an airflow volume 252 in fluid communication with each of the plurality of openings 232. In this particular embodiment, the airflow volume 252 is mutually defined by the diffusion plate housing 250, the diffusion plate 230, and an outer surface 218 of the extractor housing 210. The airflow volume 252 is positioned between the extractor housing 210 and the diffusion plate 230. The second connector tube 228 is in fluid communication with the airflow volume 252. In particular, the second connector tube 228 is coupled to the diffusion plate housing 250 about an opening and defines an airflow pathway between the outside of the diffusion plate housing 250 and the airflow volume 252.

A perimeter region 236 of the diffusion plate 230 surrounds the plurality of openings 232 and is coupled to a rim 254 of the diffusion plate housing 250. The rim 254 of the diffusion plate housing 250 surrounds the airflow volume 252. The diffusion plate housing 250 and the extractor housing 210 can be separate components in some embodiments, and in other embodiments the diffusion plate housing 250 and the extractor housing 210 can be portions of a single component.

As discussed above, in the current example, the hose 220 is used in both point-of-use extraction and zone extraction. When configured for zone extraction, the hose 220 is coupled to the second connector tube 228 and the fan 280 is in communication with the first inlet 202, the second inlet 204, and the outlet 206. When configured for point-of-use extraction, the distal end 222 of the hose 220 is released from the second connector tube 228, and the fan 280 is in communication with the first inlet 202 and the outlet 206. In particular, the fan selectively generates airflow from the first inlet 202 through the outlet 206, and optionally through the second inlet 204.

The fume extractor 200 defines a hose channel 240 that is configured to selectively receive a length of the hose 220. In various embodiments, the hose channel 240 stores the hose 220 when the hose 220 is coupled to the second connector tube 228 for zone extraction and when the fume extractor 200 is not in use. In the current example, the hose channel 240 extends about a periphery of the fume extractor 200 and, in particular, about a periphery of the diffusion plate housing 250. The hose 220 is configured to be retained within the hose channel 240 within the outer perimetric boundaries of the fume extractor 200.

In the current example, the hose channel 240 is cumulatively defined by the diffusion plate housing 250 and the extractor housing 210. The hose channel 240 is defined between the diffusion plate 230 and the extractor housing 210. The extractor housing 210 and the diffusion plate housing 250 form hose guides to retain the position of the hose 220 about the diffusion plate housing 250.

The fume extractor 200 has a first supporting surface 260 that is opposite the diffusion plate 230 relative to the extractor housing 210. In the current example, the first supporting surface 260 is defined by the extractor housing 210. More particularly, the first supporting surface 260 is completely defined by the extractor housing 210. The first supporting surface 260 is generally configured to selectively rest on a planar surface, such as a tabletop or a floor. In the current example, the first supporting surface 260 defines a first support plane 262 that is opposite the main surface 234 relative to the extractor housing 210. The first supporting surface 260 is parallel to the main surface 234 of the diffusion plate 230. In various embodiments the main surface 234 of the diffusion plate 230 is configured to form a substantially horizontal work surface when the first supporting surface 260 rests on a tabletop or floor. In some embodiments, brackets and/or feet, or other structures can be coupled to the extractor housing 210 to form the first supporting surface.

The fume extractor 200 has a second supporting surface 270a, 270b that is generally orthogonal to the diffusion plate 230, which is best visible in FIG. 5. The second supporting surface 270a, 270b is generally configured to selectively rest on a planar surface, such as a tabletop or a floor. The second supporting surface 270a, 270b defines a second support plane 272 that is generally orthogonal to the main surface 234 of the diffusion plate 230. The second support plane 272 is generally coplanar with the planar surface on which the second supporting surface 270a, 270b is configured to selectively rest upon. The second support plane 272 can be substantially orthogonal to the first support plane 262 in some embodiments. In the current example, the second support plane 272 is about 95° from the first support plane 262, but the second support plane 272 can range from about 80° to about 100° from the first support plane 262. In various embodiments the main surface 234 of the diffusion plate 230 is configured to form a generally vertical surface when the second supporting surface 270a, 270b rests on a tabletop or floor.

In the current example, the second supporting surface 270a, 270b is cumulatively defined by (1) an edge of the diffusion plate 230 (270a) and (2) a portion of a sidewall 214 of the extractor housing 210. To configure the diffusion plate 230 for backdraft extraction, a user can place the fume extractor 200 on a table such that the second supporting surface 270 rests on the table. Such a configuration positions the second inlet 204 of the diffusion plate 230 for backdraft extraction.

In various embodiments, the first supporting surface 260 and/or the second supporting surface 270a, 270b are configured to increase traction between the fume extractor and the planar surface. For example, the first supporting surface 260 and/or the second supporting surface 270a, 270b can have surface irregularities that results in a relatively increased surface roughness compared to a smooth surface. Generally the first supporting surface 260 and the second supporting surface 270a, 270b are configured to be electrically conductive to enable welding operations. In some embodiments, an electrically conductive wire 274 can electrically couple to the diffusion plate 230 to one or more of the supporting surfaces, such as the wire 274 visible in FIG. 4.

While the current description focuses on the first supporting surface 260 and the second supporting surface 270a, 270b, similar to the description of FIG. 1, the fume extractor 200 can have up to five supporting surfaces, corresponding to the five sides of the fume extractor 200 other than the side defined by the diffusion plate 230. Each of the supporting surfaces can have a similar construction or a different construction to the first supporting surface 260 and the second supporting surface 270a, 270b described above. Alternate configurations for the supporting surfaces are also contemplated.

Figure 6:
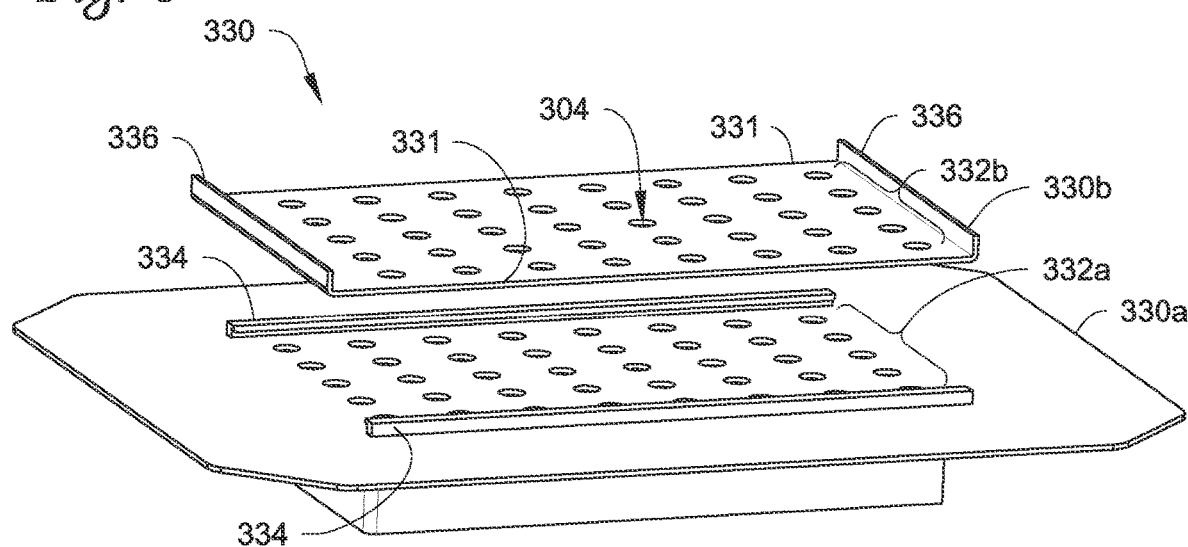
FIG. 6 is an example diffusion plate consistent with some examples.

FIG. 6 is a perspective view of another example diffusion plate 330 consistent with various embodiments. The diffusion plate 330 has a fixed plate 330a and a sliding plate 330b that are configured to selectively define a second inlet 304 of a fume extractor. The fixed plate 330a is configured to be coupled to an extractor housing or a diffusion plate housing consistent with those described above. The fixed plate 330a defines a fixed plurality of openings 332a that partially define the second inlet 304 of the fume extractor. The sliding plate 330b also defines a sliding plurality of openings 332b that also partially define the second inlet 304 of the fume extractor.

The sliding plate 330b is slidably coupled to the fixed plate 330a to define a first position where the second inlet 304 is unobstructed and a second position with the second inlet 304 is obstructed. The fixed plate 330a defines slide channels 334 that slidably receive corresponding edges 331 of the sliding plate 330b. The sliding plate 330b can define grasping features 336 that are configured to be grasped by a user to slide the sliding plate 330b relative to the fixed plate 330a.

A user slides the sliding plate 330b along the fixed plate 330a to bring the sliding plurality of openings 332b into alignment with the fixed plurality of openings 332a to open the second inlet 304. In some such examples, a valve can selectively obstruct the airflow pathway defined by the hose of the fume extractor (such as a hose disclosed with reference to FIG. 1) to maximize airflow through the second inlet 304. The sliding plate 330b can be slid along the fixed plate 330a to obstruct the fixed plurality of openings 332a with the portions of the sliding plate 330b that are between the sliding openings 332b, which obstructs the second inlet 304. In the latter configuration, the fume extractor can be used for point-of-use extraction. If the hose incorporates a shut-off valve, the shut-off valve can be opened to open the airflow pathway through the hose and a first inlet defined by the hose (such as described earlier) can be positioned proximate a work surface for extraction.

The diffusion plate 330 can have a variety of alternate configurations. In some embodiments, the diffusion plate can have a flap that is manually positioned over the plurality of openings to obstruct the second inlet to modify the fume extractor in a point-of-use configuration. In such an example, the flap can be pivotably coupled to the diffusion plate 330.

Figure 7:
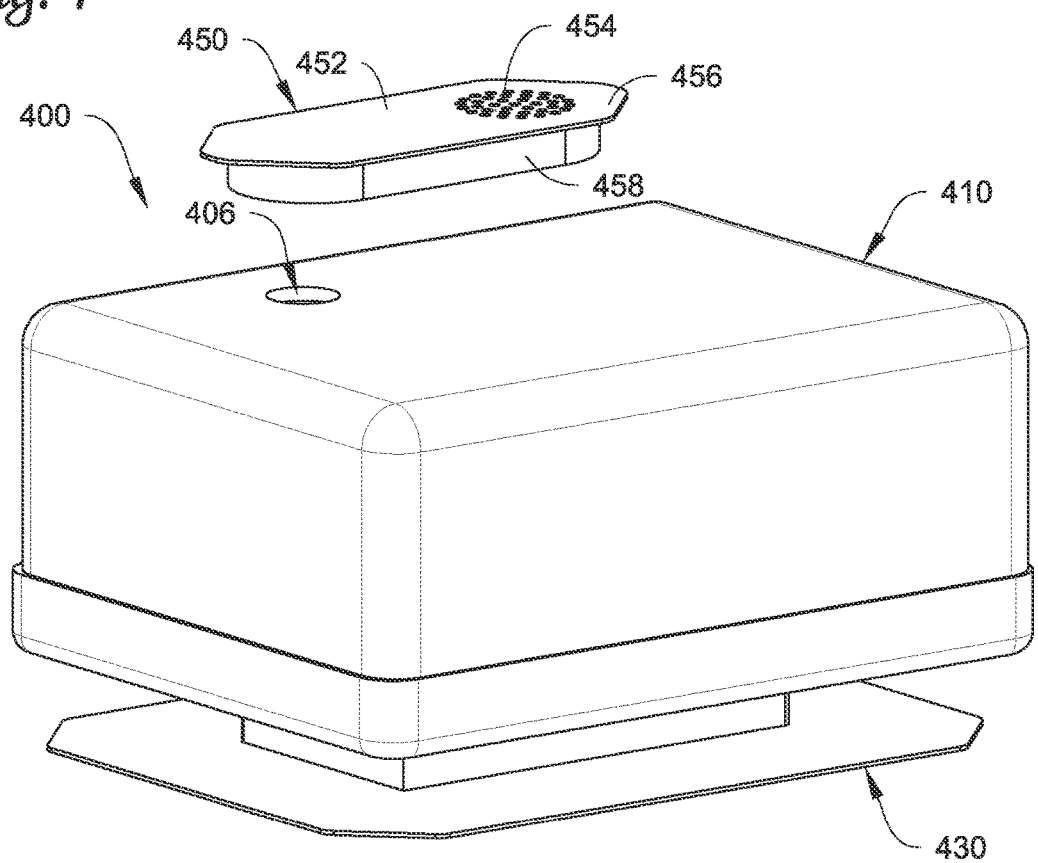
FIG. 7 is a partial exploded view of another example fume extractor.

FIG. 7 depicts a bottom exploded view of another example fume extractor 400 consistent with some examples. The fume extractor 400 has an extractor housing 410, a hose (not currently visible), and a diffusion plate 430 consistent with examples discussed throughout this paper. The extractor housing 410 defines an outlet 406 of the fume extractor 400. In the current example, a damper 450 can be coupled to the extractor housing 410 over the outlet 406 to reduce noise escaping from the housing that can be generated by the fan. In the current example, the damper 450 forms a casing 452 around the outlet 406 and defines a vent opening 454 that is unaligned with the outlet 406 but is in fluid communication with the vent opening 454. In the current example, the damper 450 has a perimetric flange 456 extending around the casing 452. The perimetric flange 456 is spaced from the extractor housing 410 to define a cord storage area 458 about the casing 452 between the perimetric flange 456 and the extractor housing 410. The cord storage area 458 is configured to accommodate a power cord, such as a power cord for a fan in the extractor housing 410.

Fume extractors consistent with the technology disclosed herein can incorporate additional features or modifications to help lessen noise associated with operation of fume extractor. In some embodiments, the fan and filter do not make direct contact with the extractor housing. In some embodiments, acoustic dampening material can be disposed in the extractor housing between the fan and/or the filter and the extractor housing.

Figure 8:
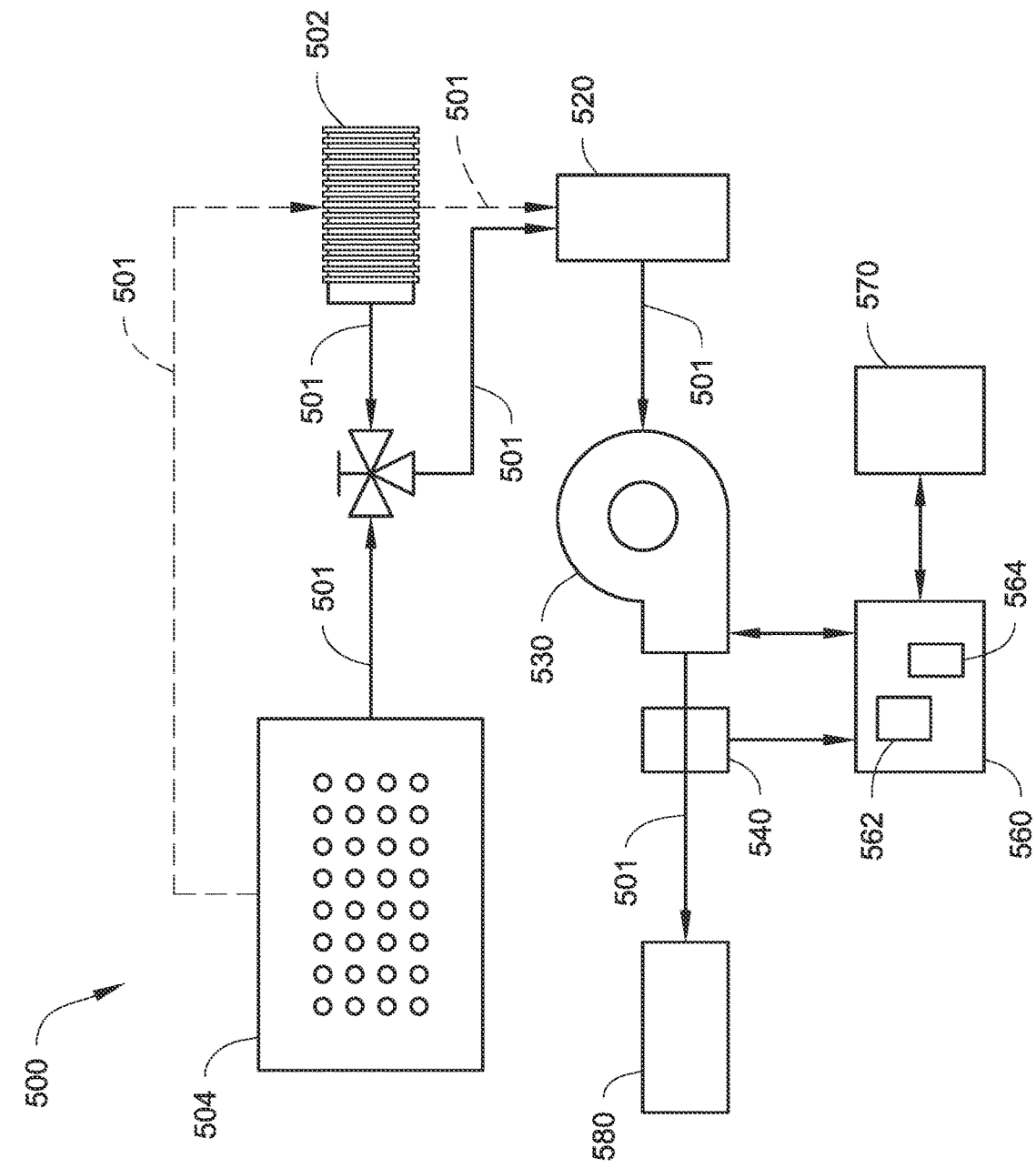
FIG. 8 is a schematic of an example fume extractor consistent with the technology disclosed herein.

FIG. 8 is a schematic of an example fume extractor 500 consistent with embodiments. The fume extractor 500 has a first inlet 502, a second inlet 504, and a fan 530. The fume extractor 500 is configured to extract fumes from a work area. The first inlet 502 is generally a point-of-use extraction inlet and the second inlet 504 is a zone extraction inlet, each of which are described in detail herein above. Each of the first inlet 502 and the second inlet 504 are configured to be in fluid communication with the fan 530 via an airflow pathway 501.

In some embodiments, the first inlet 502 and the second inlet 504 are arranged in parallel relative to the fan 530, such as described above with reference to FIGS. 1 and 6. In such embodiments, a valve 510 can be disposed along the airflow pathway 501 to selectively establish fluid communication between either (1) the fan 530 and the first inlet 502 (for point-of-use extraction) or (2) the fan 530 the second inlet 504 (for zone extraction). The valve 510 can be manually or electrically actuated. Consistently with examples described above, an obstruction such as a barrier, sliding plate, shut-off valve, flap, cover, or the like, can be incorporated in the fume extractor 500 that is configured to selectively obstruct one of the first inlet 502 and the second inlet 504. Such an obstruction can be used in combination with or alternate to the three-way valve 510 depicted in the schematic of FIG. 8.

In some embodiments the first inlet 502 and the second inlet 504 are arranged in a series relative to the fan 530, such as described above with reference to FIGS. 2-5. The first inlet 502 is in fluid communication with the fan 530 and the second inlet 504 is selectively in fluid communication with the first inlet 502 for zone extraction. The second inlet 504 is decoupled from the first inlet 502 for point-of-use extraction. An airflow pathway 501 selectively fluidly couples the second inlet 504 to the first inlet 502, and the airflow pathway 501 couples the first inlet 502 to the fan 530.

A filter 520 is operatively disposed in the airflow pathway 501 between the fan 530 and the first and second inlet 502, 504. The filter 520 can be consistent with filters generally discussed herein. A damper 580 can be disposed along the airflow pathway 501 that is configured to reduce noise generated from the fan 530. The damper 580 can be consistent with those discussed above.

In the current example, a flow rate regulator 560 is in operative communication with the fan 530. The flow rate regulator 560 is generally configured to establish and maintain a particular flow rate of air through the airflow pathway 501 by adjusting fan 530 operation. The flow rate of the fan 530 can be set by a user through a user interface 570 in communication with the flow rate regulator 560. A sensor 540 disposed in the airflow pathway 501 is configured to sense flow rate. The flow rate regulator 560 is configured to read the data from the sensor 540 and adjust the fan speed as appropriate to maintain the flow rate set by the user. As the filter 520 is loaded with contaminants, the flow rate regulator 560 increases the fan speed to maintain the same flow rate. In some embodiments, when the fan reaches a maximum speed, the flow rate regulator can provide a notification to a user to replace the filter.

While the sensor 540 is currently depicted downstream of the fan 530, in some embodiments the sensor 540 is positioned upstream of the fan 530. In some embodiments the sensor can be positioned within the fan itself. Other configurations are certainly contemplated.

The flow rate regulator 560 can have a processor 562 that receives various inputs and executes one or more computer programs or applications stored in a memory 564. The memory 564 can have computer-readable instructions or applications that, when executed, e.g., by the processor 562, cause the regulator 560 to perform various calculations and issue commands. The processor 562 and memory 564 can define a computing apparatus operable to process input data and generate the desired output to one or more components/devices such as the fan 530 and the user interface 570.

The functionality of the flow rate regulator 560 can be implemented in any manner known to one skilled in the art. For instance, the memory 564 can include any volatile, non-volatile, magnetic, optical, and/or electrical media, such as a random-access memory (RAM), read-only memory (ROM), non-volatile RAM (NVRAM), electrically-erasable programmable ROM (EEPROM), flash memory, and/or any other digital media. While shown as both being incorporated into the flow rate regulator 560, the memory 564 and the processor 562 could be contained in separate modules.

The processor 562 can have any one or more of a microprocessor, a controller, a digital signal processor (DSP), an application specific integrated circuit (ASIC), a field-programmable gate array (FPGA), and/or equivalent discrete or integrated logic circuitry. In some embodiments, the processor 562 can include multiple components, such as any combination of one or more microprocessors, one or more controllers, one or more DSPs, one or more ASICs, and/or one or more FPGAs, as well as other discrete or integrated logic circuitry. The functions attributed to the controller/processor herein may be embodied as software, firmware, hardware, or any combination thereof.

While not currently depicted, in a variety of embodiments a spark arrestor can be incorporated in the fume extractor 500. The spark arrestor can be disposed in the airflow pathway 501 upstream of the filter 520. The spark arrestor can be disposed in the airflow pathway 501 between the first inlet 502 and filter 520 and between the second inlet 504 and the filter 520. The spark arrestor can be constructed of flame retardant materials. In various embodiments, components of a fume extractor 500 consistent with the current disclosure can be constructed of flame retardant materials. For example, the filter 520 can incorporate filter media having a flame retardant disposed thereon.

EXEMPLARY EMBODIMENTS

Embodiment 1. A fume extractor comprising:
an extractor housing defining an outlet of the fume extractor;
a hose coupled to the extractor housing, wherein the hose has a distal end defining a first inlet of the fume extractor;
a diffusion plate coupled to the extractor housing, wherein the diffusion plate defines a plurality of openings that cumulatively define a second inlet of the fume extractor;
a fan disposed in the extractor housing, the fan configured to connect each of the first inlet and the second inlet to the outlet;
a first supporting surface opposite the diffusion plate relative to the extractor housing; and
a second supporting surface is from 80° to 100° to the diffusion plate, wherein the first supporting surface and the second supporting surface are configured to selectively rest on a planar surface, and
wherein the fume extractor defines a hose channel configured to selectively receive the hose.

Embodiment 2. The fume extractor of any one of embodiments 1 and 3-20, wherein the hose channel extends about a periphery of the fume extractor.

Embodiment 3. The fume extractor of any one of embodiments 1-2 and 4-20, wherein the hose channel is defined between the extractor housing and the diffusion plate.

Embodiment 4. The fume extractor of any one of embodiments 1-3 and 5-20, further comprising a hose guide.

Embodiment 5. The fume extractor of any one of embodiments 1-4 and 6-20, wherein the hose defines an intake area of less than 79.2 in$^2$.

Embodiment 6. The fume extractor of any one of embodiments 1-5 and 7-20, wherein the diffusion plate defines an intake area of greater than 79.2 in$^2$.

Embodiment 7. The fume extractor of any one of embodiments 1-6 and 8-20, further comprising a filter disposed in the extractor housing in an airflow pathway between the first and second inlets and the outlet.

Embodiment 8. The fume extractor of any one of embodiments 1-7 and 9-20, further comprising an electrically conductive wire electrically coupling the diffusion plate to the first supporting surface and the second supporting surface.

Embodiment 9. The fume extractor of any one of embodiments 1-8 and 10-20, wherein each of the plurality of openings is threaded.

Embodiment 10. The fume extractor of any one of embodiments 1-9 and 11-20, wherein the first supporting surface is defined by a plurality of feet extending outward from the extractor housing away from the diffusion plate.

Embodiment 11. The fume extractor of any one of embodiments 1-10 and 12-20, wherein the second supporting surface is partially defined by the extractor housing.

Embodiment 12. The fume extractor of any one of embodiments 1-11 and 13-20, wherein the first supporting surface is completely defined by the extractor housing.

Embodiment 13. The fume extractor of any one of embodiments 1-12 and 14-20, wherein the diffusion plate comprises aluminum having a thickness of at least 0.25 inches.

Embodiment 14. The fume extractor of any one of embodiments 1-13 and 15-20, wherein the openings in the diffusion plate are each circular with a diameter of at least ⅜-inch.

Embodiment 15. The fume extractor of any one of embodiments 1-14 and 16-20, wherein the hose defines an airflow pathway and comprises an obstruction that selectively obstructs the airflow pathway upon the hose channel receiving the hose.

Embodiment 16. The fume extractor of any one of embodiments 1-15 and 17-20, further comprising a flow rate regulator configured to measure and regulate airflow.

Embodiment 17. The fume extractor of any one of embodiments 1-16 and 18-20, wherein the first inlet and the second inlet are arranged in series.

Embodiment 18. The fume extractor of any one of embodiments 1-17 and 19-20, wherein the first inlet and the second inlet are arranged in parallel.

Embodiment 19. The fume extractor of any one of embodiments 1-18 and 20, wherein the diffusion plate comprises a fixed plate defining a fixed plurality of openings and a sliding plate defining a sliding plurality of openings, wherein the sliding plate is slidably coupled to the fixed plate to selectively align the fixed plurality of openings with the sliding plurality of openings.

Embodiment 20. The fume extractor of any one of embodiments 1-19, wherein the first inlet is in selective fluid communication with the second inlet.

It should also be noted that, as used in this specification and the appended claims, the phrase "configured" describes a system, apparatus, or other structure that is constructed to perform a particular task or adopt a particular configuration.

The word "configured" can be used interchangeably with similar words such as "arranged", "constructed", "manufactured", and the like.

All publications and patent applications in this specification are indicative of the level of ordinary skill in the art to which this technology pertains. All publications and patent applications are herein incorporated by reference to the same extent as if each individual publication or patent application was specifically and individually indicated by reference. In the event that any inconsistency exists between the disclosure of the present application and the disclosure(s) of any document incorporated herein by reference, the disclosure of the present application shall govern.

This application is intended to cover adaptations or variations of the present subject matter. It is to be understood that the above description is intended to be illustrative, and not restrictive, and the claims are not limited to the illustrative embodiments as set forth herein.

What is claimed is:

1. A fume extractor comprising:
    an extractor housing defining an outlet of the fume extractor;
    a hose coupled to the extractor housing, wherein the hose has a distal end defining a first inlet of the fume extractor;
    a diffusion plate coupled to the extractor housing, wherein the diffusion plate defines a plurality of openings that cumulatively define a second inlet of the fume extractor;
    a fan disposed in the extractor housing, the fan configured to connect each of the first inlet and the second inlet to the outlet;
    a first supporting surface opposite the diffusion plate relative to the extractor housing;
    a second supporting surface is from 80° to 100° to the diffusion plate, wherein the first supporting surface and the second supporting surface are configured to selectively rest on a planar surface, and wherein the fume extractor defines a hose channel extending about a periphery of the fume extractor that is configured to selectively receive the hose; and
    an electrically conductive wire electrically coupling the diffusion plate to the first supporting surface and the second supporting surface.

2. The fume extractor of claim 1, wherein the hose channel is defined between the extractor housing and the diffusion plate.

3. The fume extractor of claim 1, further comprising a hose guide.

4. The fume extractor of claim 1, wherein the hose defines an intake area of less than 79.2 in$^2$.

5. The fume extractor of claim 1, wherein the diffusion plate defines an intake area of greater than 79.2 in$^2$.

6. The fume extractor of claim 1, further comprising a filter disposed in the extractor housing in an airflow pathway between the first and second inlets and the outlet.

7. The fume extractor of claim 1, wherein each of the plurality of openings is threaded.

8. The fume extractor of claim 1, wherein the first supporting surface is defined by a plurality of feet extending outward from the extractor housing away from the diffusion plate.

9. The fume extractor of claim 1, wherein the second supporting surface is partially defined by the extractor housing.

10. The fume extractor of claim 1, wherein the first supporting surface is completely defined by the extractor housing.

11. The fume extractor of claim 1, wherein the diffusion plate comprises aluminum having a thickness of at least 0.25 inches.

12. The fume extractor of claim 1, wherein the openings in the diffusion plate are each circular with a diameter of at least ⅜-inch.

13. The fume extractor of claim 1, wherein the hose defines an airflow pathway and comprises an obstruction that selectively obstructs the airflow pathway upon the hose channel receiving the hose.

14. The fume extractor of claim 1, further comprising a flow rate regulator configured to measure and regulate airflow.

15. The fume extractor of claim 1, wherein the first inlet and the second inlet are arranged in series.

16. The fume extractor of claim 1, wherein the first inlet and the second inlet are arranged in parallel.

17. The fume extractor of claim 1, wherein the diffusion plate comprises a fixed plate defining a fixed plurality of openings and a sliding plate defining a sliding plurality of openings, wherein the sliding plate is slidably coupled to the fixed plate to selectively align the fixed plurality of openings with the sliding plurality of openings.

18. The fume extractor of claim 1, wherein the first inlet is in selective fluid communication with the second inlet.

* * * * *